Nov. 2, 1926. 1,605,446
F. F. KISHLINE
METALLIC DUST EXCLUDER FOR UNIVERSAL JOINTS
Filed Nov. 16, 1925

Inventor
Floyd F. Kishline
By Alexander & Dowell
Attorneys

Patented Nov. 2, 1926.

1,605,446

UNITED STATES PATENT OFFICE.

FLOYD F. KISHLINE, OF DETROIT, MICHIGAN, ASSIGNOR TO THE UNIVERSAL PRODUCTS CO., INC., OF DETROIT, MICHIGAN, A CORPORATION OF DELAWARE.

METALLIC DUST EXCLUDER FOR UNIVERSAL JOINTS.

Application filed November 16, 1925. Serial No. 69,284.

This invention is a novel all metal dust excluder for universal couplings or joints, such as are commonly employed in automobile transmission mechanisms. Its objects are to provide a practical all metal housing which will permit relative longitudinal and oscillatory movements of the member of the joint, and prevent entrance of dust into the joint, and escape of grease from the joint.

The invention is applicable to various forms of universal joints having two members, one member being the driving member, and the other the driven member of the joint, with one of the members telescoping into the other, and particularly to such joints provided with means causing the members to rotate in unison, while permitting longitudinal and angular movement of the driven member, during rotation, with respect to the driving member.

In the accompanying drawings I have illustrated one practical embodiment of the invention, and will hereinafter describe the same with reference thereto, and summarize in the claims the novel features of construction and novel combinations of parts for which protection is desired.

Figure 1:
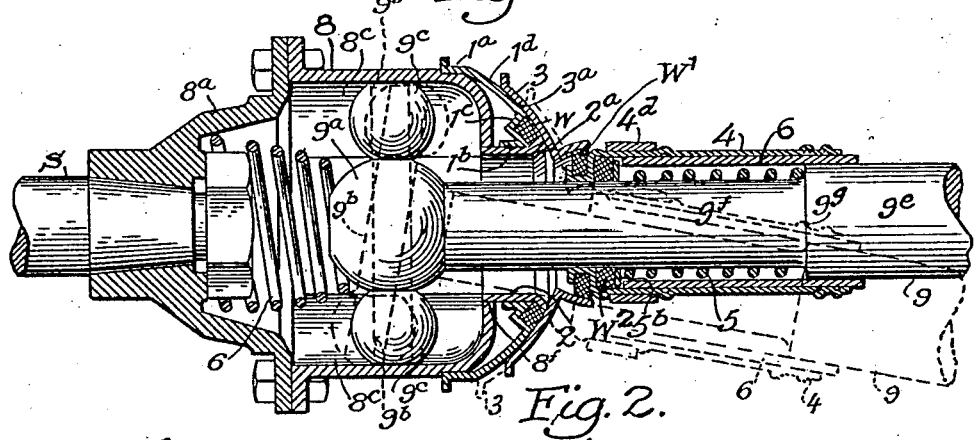
Figure 1 is a longitudinal sectional view of a well known universal joint, with my novel, flexible, metallic boot or housing applied thereto.
Figure 2:
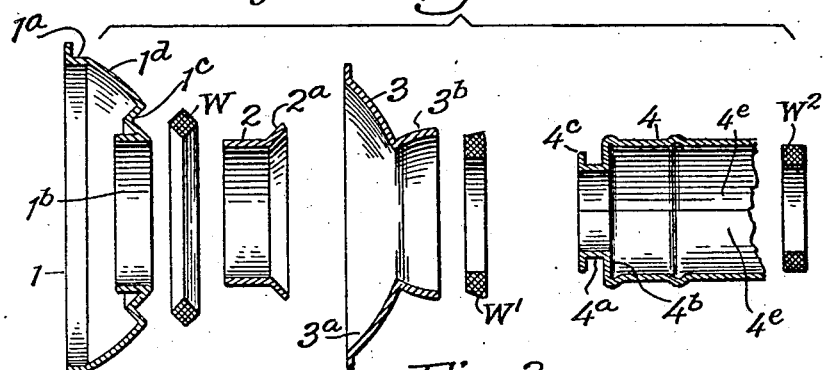
Figure 2 is a longitudinal sectional view of the various parts of the housing detached from the joint and disassembled.

In the particular form of joint shown in the drawings the driving member comprises a casing composed of two separable parts 8, 8ª, which are arranged end to end and are flanged on their meeting edges and united by bolts. The member 8 has a central bore and diametrically opposite slots which are engaged by balls 9ᶜ on opposite ends of a pin transfixing the head 9ª of the driven member or shaft section 9. A helical spring 6 may be interposed between the head 9ª and the adjacent face of the casing 8ª to normally press the shaft 9 outward. The slots and balls constitute a driving connection between the parts 8 and 9, and shaft 9 is also capable of oscillatory or angular movement relative to the part 8, as indicated in dotted lines in Figure 1, this oscillatory movement being permitted by the movement of balls 9ᶜ in the slots 8ᶜ, and by the pivoting of the shaft 9 on the pin 9ᵇ at right angles to the slots, thus permitting a universal angular movement of shaft 9 relative to the casing 8. The construction also permits longitudinal movement of shaft 9 relative to part 8.

The part 8ª of the casing may be attached in the usual manner to a driving shaft S connected with the engine, not shown, whereby the casing is rotated, and shaft 9 is rotated by and with the casing, while capable of oscillatory and longitudinal movements relative to the casing, as above described. The parts described are well known and need no further illustration or explanation; and the universal joint per se may be any desired construction.

Ordinarily when applied to automobiles, a flexible so-called "boot" of leather or other flexible material is attached, at one end, to the open end of part 8, and at the other end, to the shaft 9. In the present invention I eliminate this flexible boot, and provide a novel all metal boot or housing.

The novel metal housing comprises in brief four metallic members 1, 2, 3, and 4, preferably made out of pressed steel or other suitable metal, three washers, and a spring. The member 1 is approximately a hollow semisphere in form, and is adapted to enclose the outer end of the part 8 of the casing, and as shown is provided at its larger open end with an annular part 1ª adapted to fit on an annular shoulder on the end of the part 8 of the casing. The member 1 projects slightly beyond the end of part 8, as shown, and is provided with a central opening surrounded by an inwardly projecting flange 1ᵇ and around and exterior to this flange 1ᵇ. Member 1 is formed with an approximately V-shaped recess 1ᶜ for the accommodation of a washer W hereinafter referred to. The portion 1ᵈ of part 1 (between the groove 1ᶜ and the portion 1ª) is parti-spherical on its exterior surface for a purpose hereinafter explained.

The second member 2 of the housing is tubular and has one end fitted within the opening 8ᶠ in the end of the casing member 8 opposite the shaft S, and may be secured thereto by a pressed fit, or welding, or otherwise. The outer end of the member 2 is provided with an outwardly flaring flange 2ª, which is parallel with the opposed wall of the groove 1ᶜ, and coincides therewith as shown, and in the groove formed between the outer wall of the groove 1ᶜ in part 1 and the flange 2ª of part 2 is fitted a removable washer W, which may be of any suitable material, but is preferably of cork.

The third member 3 of the housing is also preferably made of stamped metal and has a major portion 3ª which is parti-spherical on its inner surface, to correspond with the exterior parti-spherical surface of the portion 1ᵈ of the member 1; and the inner surface of the portion 3ª has a close sliding fit with the outer surface of the portion 1ᵈ as shown in Figure 1, and a washer W interposed between these two portions prevent the entry of any dust or dirt into the casing 8 as is obvious.

The member 3 has a central opening which is surrounded by an outwardly oppositely projecting part 3ᵇ whose inner surface is parti-spherical; the part 3ᵇ extends oppositely to the part 3ª, and is of less diameter than the part 3ª.

The inner spherical surface of the part 3ᵇ is adapted to contact with the parti-spherical surface of a washer W′ which is fitted in an annular groove 4ª on the inner end of the fourth member 4 of the casing.

The fourth member 4 is a tubular shell, preferably of drawn metal, and is of slightly larger diameter than the shaft 9 and has a sliding fit thereon. As shown the member 4 is provided on one end with a U-shaped flange 4ᶜ, the recess in the flange forming an annular seat for the washer W′. The shaft 9 has a slightly reduced portion 9ᶠ which is surrounded by the sleeve member 4. A washer W² is strung on the reduced portion 9ᶠ and contacts with the flange 4ᶜ on the end of the member 4. A coil spring 5 is strung on the part 9ᶠ, within the sleeve member 4 and between the washer W² and the shoulder 9ᵍ on the shaft 9ᵉ, as shown in Figure 1. As shown, a washer 5ᵇ may be interposed between the spring 5 and the washer W² within the member 4. This spring 5 tends to yieldingly force the member 4 toward the casing and cause the washer W′ to tightly and yieldingly engage the part 3ᵇ of member 3, and in turn cause the part 3ª of member 3 to closely but slidably engage portion 1ᵈ of member 1 and thus the several parts are maintained in contact while capable of such relative sliding motion as will permit the shaft 9ᵉ to oscillate as is required in the operation of the joint.

Figure 3:
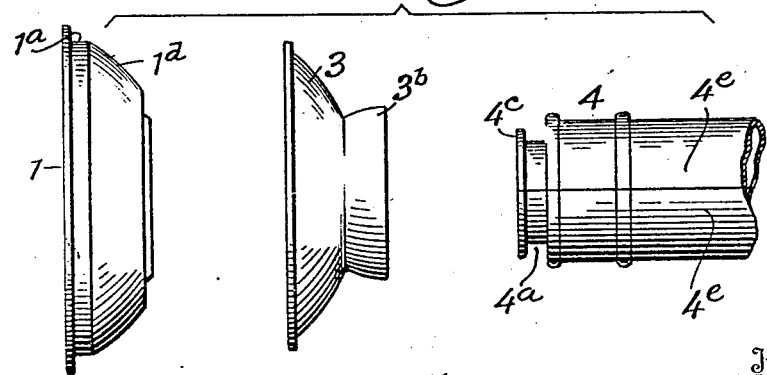
Figure 3 is a side view of the several metal parts of the housing disassembled.

If desired a sleeve 6 might be placed on the shaft 9 and within the member 4 as shown in Figure 1. This sleeve may be an integral tube, and the member 4 could be split, or made of two opposite similar halves 4ᵉ as indicated in Figure 3, and assembled around the sleeve 6 and secured thereto by annular clamps.

It will be seen that while member 1 of the housing is fast to the part 8, member 3 of the housing is capable of universal movement relatively to the member 1 and the washer W². By reason of this capability of angular movement of member 3 relative to the part 1 and the washer W² and the latter's slidability on the shaft 9, under the action of member 4 and spring 5, the shaft 9 is permitted to freely move longitudinally and angularly with respect to casing 8 within certain limits, as indicated in dotted lines in Figure 1. The extent of angular movement of member 3 relative to the casing 8 is amply sufficient to take care of all ordinary deflections of the joint in the practical operation or use of the universal joint.

The novel all metal housing or boot does not interfere with the necessary free angular and longitudinal movements of the joint members in the practical operation thereof; and effectively excludes dust from the joint and retains grease therein.

The said metallic housing or boot readily accommodates itself to all angular positions of the members of the joint within a given radius, and relative longitudinal play of the members of the coupling does not injure or open the joints of the housing, dust is effectively excluded from the housing, and grease confined therein.

I claim:

1. For a universal joint having a hollow casing, a shaft entering the casing, and a universal connection between the casing and the shaft; a metallic housing comprising a member attached to the casing and having an outer parti-spherical portion; a second housing member loosely surrounding the shaft and having a parti-spherical portion slidably fitted to the parti-spherical portion of the first member and an oppositely extending parti-spherical portion; and a slidable member on the shaft engaging the last mentioned portion; and spring means for holding the members in engagement.

2. A metallic housing for a universal joint having a hollow casing, a shaft entering the casing, and a universal connection between the casing and the shaft; said housing comprising a member fixedly attached to the casing and having an outer parti-spherical portion; a second housing member loosely surrounding the shaft and having a parti-spherical portion slidably fitted to the parti-spherical portion of the first member and an oppositely extending parti-spherical portion; a dust excluding washer between the spherical portions of said first and second members, and a slidable member on the shaft engaging the said oppositely extending portion; and spring means for holding the members in engagement.

3. A metallic housing for universal joints having a hollow casing, a shaft entering the casing, and a universal connection between the casing and the shaft; said housing comprising a member attached to the casing and having an outer parti-spherical portion; a tubular member attached to the casing and extending axially of said portion; a washer carried by the said portion; a second housing member loosely surrounding the shaft and having a parti-spherical portion slidably fitted to the parti-spherical portion of the first member and engaging said washer, and spring means for pressing the members into engagement.

4. A metallic housing for universal joints having a hollow casing, a shaft entering the casing, and a universal connection between the casing and the shaft; said housing comprising a member attached to the casing and having an outer parti-spherical portion; a tubular member attached to the casing and projecting into the first member; a washer carried by said portion; a second housing member loosely surrounding the shaft and having a parti-spherical portion slidably fitted to the parti-spherical portion of the first member and engaging said washer, and also having an oppositely extending parti-spherical portion; and a slidable member on the shaft engaging the latter portion; and spring means for pressing the members into engagement.

5. For a universal joint having a hollow casing, a shaft entering the hollow casing, and a universal connection between the hollow end of the casing and the shaft; a metallic housing comprising a member fixedly attached to the casing and having an outer parti-spherical portion; a second housing member loosely surrounding the shaft and having a parti-spherical portion slidably engaging the parti-spherical portion of the first member and also having an oppositely extending parti-spherical portion; a slidable sleeve member on the shaft projecting into said oppositely extending portion of the second member; a washer interposed between said slidable sleeve member and the said oppositely extending portion of the second member, and spring means for holding the members of the housing in engagement.

6. A metallic housing for universal joints having a hollow casing, a shaft entering the hollow casing, and a universal connection between the hollow end of the casing and the shaft; said housing comprising a member fixedly attached to the casing and having an outer parti-spherical portion; a second housing member loosely surrounding the shaft and having a first parti-spherical portion slidably engaging the parti-spherical portion of the first member and also having an oppositely extending parti-spherical portion; a slidable sleeve member on the shaft projecting into said oppositely extending portion of the second member; a dust excluding washer between the spherical portions of said first and second members; a washer interposed between said slidable sleeve member and the said oppositely extending portion of the second member, and spring means for holding the members of the housing in engagement.

7. For a universal joint having a hollow casing, a shaft entering the hollow casing, and a universal connection between the hollow end of the casing and the shaft; a metallic housing comprising a member fixedly attached to the casing and having an outer parti-spherical portion; a tubular member attached to the casing and projecting into the first member; a second housing member loosely surrounding the shaft and having a first parti-spherical portion slidably engaging the parti-spherical portion of the first member; a slidable sleeve member on the shaft; a washer interposed between said slidable sleeve member and the second member, and spring means for holding the members of the housing in engagement.

8. For a universal joint having a hollow casing, a shaft entering the hollow casing, and a universal connection between the hollow end of the casing and the shaft; a metallic housing comprising a member fixedly attached to the casing and having an outer parti-spherical portion; a tubular member attached to the casing and projecting into the first member; a second housing member loosely surrounding the shaft and having a first parti-spherical portion slidably engaging the parti-spherical portion of the first member and also having an oppositely extending parti-spherical portion; a slidable sleeve member on the shaft projecting into said oppositely extending parti-spherical portion of the second member; a washer interposed between said slidable sleeve member and the said oppositely extending portion of the second member, and spring means for holding the members of the housing in engagement.

9. For a universal joint having a hollow casing, a shaft entering the hollow casing, and a universal connection between the hollow end of the casing and the shaft; a metallic housing comprising a first housing member fixedly attached to the hollow casing and having an outer parti-spherical portion; a second housing member loosely surrounding the shaft and having a projecting parti-spherical portion slidably engaging the parti-spherical portion of the first member and also having an oppositely extending parti-spherical portion of smaller diameter; a slidable sleeve on the shaft projecting into said oppositely extending portion of the second member; a washer interposed between said sleeve and the oppositely extending portion of the second member; and a spring within said sleeve for pressing the members of the housing into engagement.

10. For a universal joint having a hollow casing, a shaft entering the hollow casing, and a universal connection between the hollow end of the casing and the shaft; a metallic housing comprising a first housing member fixedly attached to the hollow casing and having an outer parti-spherical portion; a tubular member attached to the casing and projecting into the first member; a second housing member loosely surrounding the shaft and having an outwardly projecting parti-spherical portion slidably engaging the parti-spherical portion of the first member and also having an oppositely extending parti-spherical portion of smaller diameter; a slidable sleeve member on the shaft projecting into said oppositely extending portion of the second member; a washer interposed between said slidable sleeve member and the oppositely extending portion of the second member; and a spring within said sleeve for pressing the member of the housing into engagement with the parti-spherical portion of the first member.

11. For a universal joint having a hollow casing, a shaft entering the hollow casing, and a universal connection between the hollow end of the casing and the shaft; a metallic housing comprising a first housing member fixedly attached to the hollow casing and having an outer parti-spherical portion; a tubular member attached to the casing and projecting into the first member; a washer carried by said first member and tubular member; a second housing member loosely surrounding the shaft and having an outwardly projecting parti-spherical portion slidably engaging the parti-spherical portion of the first member and also having a similar oppositely extending parti-spherical portion of smaller diameter; a slidable sleeve member on the shaft projecting into said oppositely extending portion of the second member; a washer interposed between said slidable sleeve member and the oppositely extending portion of the second member; and a spring within said sleeve for pressing the members of the housing into engagement.

In testimony that I claim the foregoing as my own, I affix my signature.

FLOYD F. KISHLINE.